(12) United States Patent
Kohketsu et al.

(10) Patent No.: US 6,543,420 B2
(45) Date of Patent: Apr. 8, 2003

(54) ACCUMULATOR FUEL INJECTION SYSTEM

(75) Inventors: Susumu Kohketsu, Tokyo (JP); Keiki Tanabe, Kanagawa (JP); Shinji Nakayama, Kanagawa (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/108,894

(22) Filed: Mar. 29, 2002

(65) Prior Publication Data

US 2002/0148435 A1 Oct. 17, 2002

(30) Foreign Application Priority Data

Apr. 5, 2001 (JP) ........................................ 2001-107478

(51) Int. Cl.$^7$ ........................... F02M 45/02; F02M 33/04
(52) U.S. Cl. ........................................ 123/447; 123/300
(58) Field of Search ................................. 123/447, 446, 123/456, 299, 300, 568.18, 698; 60/278, 274, 286, 295, 297

(56) References Cited

U.S. PATENT DOCUMENTS

| | | | | |
|---|---|---|---|---|
| 5,146,894 A | * | 9/1992 | Rembold et al. | 123/447 |
| 5,732,679 A | * | 3/1998 | Takahasi et al. | 123/467 |
| 5,960,627 A | * | 10/1999 | Krampe et al. | 60/274 |
| 6,073,608 A | * | 6/2000 | Krieger et al. | 123/299 |
| 6,082,100 A | * | 7/2000 | Boegner et al. | 60/278 |
| 6,112,721 A | * | 9/2000 | Kouketsu et al. | 123/447 |

* cited by examiner

Primary Examiner—Carl S. Miller

(57) ABSTRACT

In a common rail system comprised of a first accumulator storing high-pressure fuel and a second accumulator storing low-pressure fuel, additional fuel is injected when a fuel pressure in a fuel passage or in the second accumulator (low inlet pressure of an injector) is reduced to a low pressure approximate to the pressure of the low-pressure fuel stored in the second accumulator after a switching valve is operated for disconnection from the fuel passage (switching valve drive signal OFF) at a point in time when a main injection control device finishes the injection of fuel (injector drive signal OFF) or after the main injection control device finishes the injection of fuel. This keeps the fuel pressure as low as possible during post injection to prevent the fuel from adhering to the wall surfaces of cylinder liners.

4 Claims, 5 Drawing Sheets

ACCUMULATOR FUEL INJECTION SYSTEM

BACKGROUND OF THE INVENTION

This non-provisional application claims priority under 35 U.S.C. §119(a) on Patent Application No. 2001-107478 filed in Japan on Apr. 5, 2001, which is herein incorporated by reference.

1. Field of the Invention

This invention relates to an accumulator fuel injection system, and more particularly to an accumulator fuel injection technique for quickly activating an exhaust emission control device in a diesel engine.

2. Description of Related Art

Exhaust gases emitted from a diesel engine installed in a bus, truck, or the like include a lot of particulate matters as well as HC, CO, NOx, etc. Accordingly, a diesel particulate filter that takes hold of particulate matters and removes them by burning with an external heat source, and an oxidization catalyst that processes HC and CO have been developed as after treatment devices for diesel engines. Recently, a continuous regenerative diesel particulate filter has also been proposed in which instead of an external heat source that burns particulate matters deposited on a diesel particulate filter, a catalyst for generating $NO_2$ serving as a device for supplying an oxidizing agent for oxidizing and removing particulate matters is provided upstream the diesel particulate filter to continuously process the particulate matters deposited on the diesel particulate filter by device of the generated $NO_2$. Further, it has been proposed that an $NO_x$ catalyst with a composition intended for mainly processing $NO_x$ is provided in an exhaust passage.

It is known that such oxidizing agent, continuous regenerative diesel particulate filter, and $NO_x$ catalyst is able to satisfactorily function only in an atmosphere in which exhaust gases are activated at a relatively high temperature. Therefore, in the case where an engine is cold at the start or the like, the oxidizing catalyst, continuous regenerative diesel particulate filter, and $NO_x$ catalyst are required to be quickly activated and constantly maintained in an activated state.

Accordingly, a variety of techniques have been proposed in which a heat source such as an electric heater is provided in the oxidizing catalyst, continuous regenerative diesel particulate filter, and the $NO_x$ catalyst in order to quickly activate them by heating with the heat source at the start of the engine.

However, it is not preferable to additionally provide the heat source as mentioned above since it complicates the arrangement of the after treatment system and increases the cost.

On the other hand, in recent years, to control fuel injection for a diesel engine, a comnion rail system has been developed which is capable of injecting high-pressure fuel stored in an accumulator into a combustion chamber by electrically controlling the opening and closing of a fuel injection nozzle. A diesel engine utilizing the common rail system has such a characteristic that the system is capable of freely setting the fuel injection timing by changing the opening timing of a fuel injection nozzle. Namely, the use of the common rail system enables fuel injection not only in proximity to a top dead center of a compression stroke but also in all of an intake stroke, expansion stroke, and exhaust stroke.

Further, to prevent an increase in engine operating noises and $NO_x$ resulting from a rapid explosive combustion at the initial stage of combustion, a technique has been developed in which a small amount of fuel is injected at a low pressure at the initial stage of a fuel injection cycle (initial injection), and fuel is then injected at a high pressure. This technique has been applied to the above-mentioned common rail system.

Accordingly, by utilizing the characteristics of the common rail system, a technique has been developed in which the temperatures of the oxidizing catalyst, continuous regenerative diesel particulate filter, and $NO_x$ catalyst are raised by injecting additional fuel during and after an expansion stroke (post injection) after fuel is injected for main combustion, and then causing the additional fuel to be burned in a combustion chamber by flame or to be reacted on a catalyst in an exhaust passage to raise the temperature of exhaust.

However, if high-pressure fuel is continuously injected during the post injection after fuel is injected at a high pressure, the fuel is adhered to the wall surfaces of cylinder liners to cause oil dilution, seizure, etc. due to the strong penetration power of the injected fuel.

It is therefore an object of the present invention to provide an accumulator fuel injection system that is capable of preventing fuel from adhering to the surface walls of cylinder liners by keeping a fuel pressure as low as possible during post injection intended for raising the exhaust temperature.

SUMMARY OF THE INVENTION

To accomplish the above object, the present invention provides an accumulator fuel injection system comprising: a first accumulator for storing high-pressure fuel pressurized by a pump; a fuel injection nozzle connected to said first accumulator via a fuel passage to inject fuel into a combustion chamber of an engine; a switching valve for connecting and disconnecting the high-pressure fuel stored in said first accumulator to and from said fuel passage; a second accumulator connected to a part downstream said switching valve in said fuel passage via a branch passage, said second accumulator storing fuel of lower pressure than the high-pressure fuel in said first accumulator; a pressure control valve provided in at least one of the part downstream said switching valve in said fuel passage and said second accumulator, said pressure control valve regulating a fuel pressure in said second accumulator and said fuel passage; an opening and closing valve for controlling injection of fuel from a fuel injection nozzle; main injection control device for controlling said switching valve and said opening and closing valve according to an operating state of the engine such that main fuel is injected from said fuel injection nozzle for a predetermined period of time; post injection control device for injecting additional fuel from said fuel injection nozzle after said main injection control device injects the main fuel, in a case where it is necessary to raise an exhaust temperature of the engine; and wherein said post injection control device provides control such that additional fuel is injected from said fuel injection nozzle when the fuel pressure in said fuel passage or said second accumulator has been reduced to a low pressure approximate to a pressure of the low-pressure fuel stored in said second accumulator via said pressure control valve.

Specifically, in a common rail system comprised of the first accumulator for storing high-pressure fuel and the second accumulator for storing low-pressure fuel of lower pressure than the pressure stored in the first accumulator, the additional fuel is injected from the fuel injection nozzle if the fuel pressure in said fuel passage or in the second accumulator has been reduced to a preset low pressure after said switching valve is switched for disconnection at a point in time when the injection of the main fuel by said main injection control device is finished, or after the injection of the main fuel by said main injection control device is finished.

The additional injection of the low-pressure fuel prevents the fuel from adhering to the wall surfaces of the cylinder liners while keeping the fuel pressure as low as possible during the post injection. The post injection control device injects the additional fuel after the main injection control device injects the main fuel for a predetermined period of time, and this causes the additionally injected fuel to be combusted by flame in the combustion chamber or reacted in the exhaust passage to raise the exhaust temperature. The additional injection by the post injection control device (post injection) is implemented by fuel that has been reduced to a low pressure approximate to the pressure of the low-pressure fuel stored in the second accumulator.

Therefore, the penetration power of the injected fuel is suppressed during the post injection to prevent the fuel from adhering to the surface walls of the cylinder liners. This enables activation of an after treatment device provided in an exhaust system, for example, by raising the exhaust temperature while preventing oil dilution, seizure, and the like.

BRIEF DESCRIPTION OF DRAWINGS

The name of this invention, as well as other objects and advantages thereof, will be explained in the following with reference to the accompanying drawings, in which like reference characters designate the same or similar parts throughout the figures and wherein.

DETAILED DESCRIPTION OF PREFERRED EMBODIMENT

A preferred embodiment of the present invention will now be described in detail with reference to the accompanying drawings.

Figure 1:
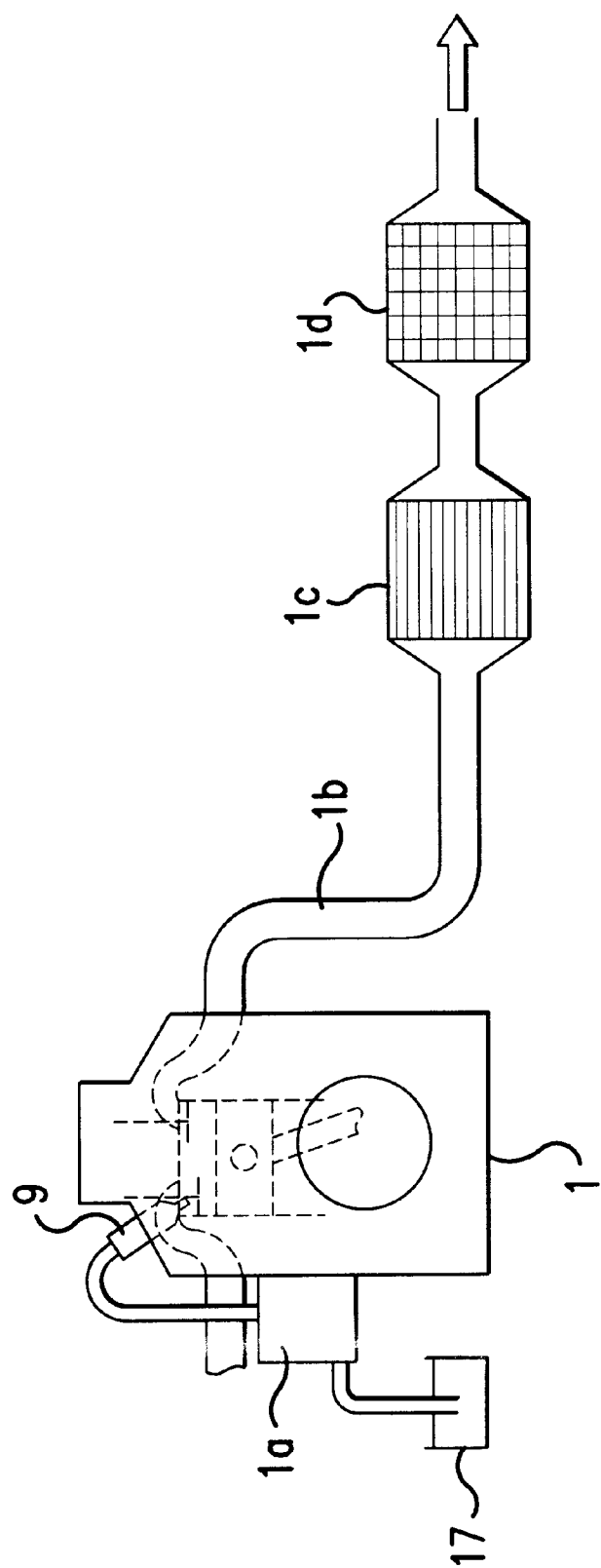
FIG. 1 is a diagram showing a diesel engine to which is applied an accumulator fuel injection system according to the present invention.
Figure 2:
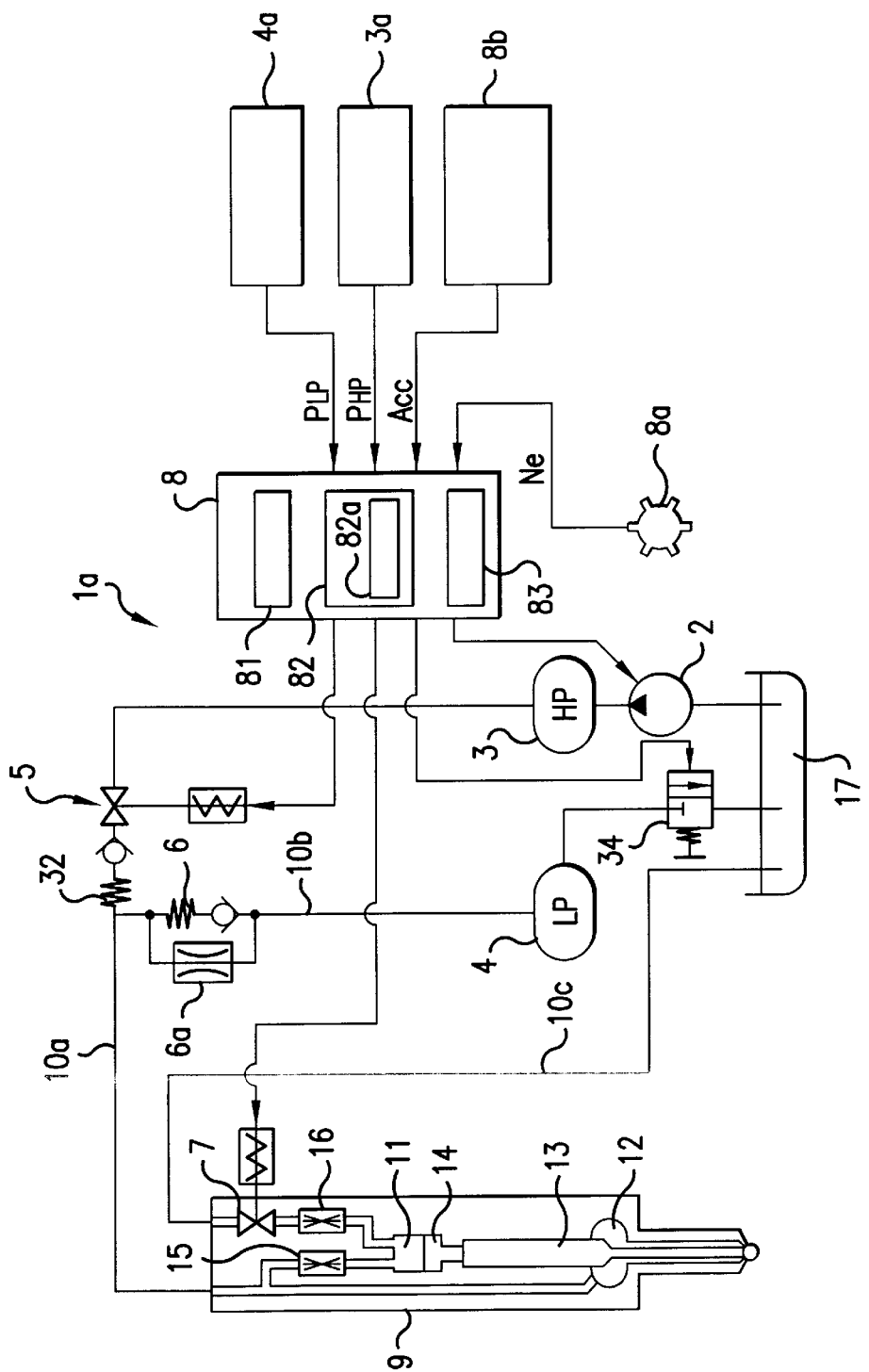
FIG. 2 is a diagram showing the arrangement of an accumulator fuel injection system according to the present invention.

FIG. 1 shows a diesel engine 1 to which is applied an accumulator fuel injection system 1a according to the present invention, and FIG. 2 shows the arrangement of the accumulator fuel injection system 1a according to the present invention.

As shown in FIG. 1, the diesel engine 1 is a serial four cylinder diesel engine, for example, and an after treatment device is provided in an exhaust passage 1b of the engine 1. The after treatment device is constructed such that an oxidization catalyst 1c is provided upstream a diesel particulate filter 1d. Such an after treatment device in which the oxidization catalyst is provided upstream the diesel particulate filter is called a continuous regenerative diesel particulate filter that is capable of continuously removing particulate matters deposited thereon by supplying an oxidization agent ($NO_2$) generated by the oxidization catalyst in an atmosphere in which the temperature of exhaust gases is relatively high.

As shown in FIG. 2, the accumulator fuel injection system 1a is equipped with a high-pressure pump 2. The high-pressure pump 2 is run by the engine 1 to pump up and pressurize fuel in a fuel tank 17. The high-pressure pump 2 is comprised of a variable displacement plunger pump, for example, and regulates an effective interval in a pumping stroke to thus control the amount of fuel flow and regulate a fuel pressure in a high-pressure accumulator 3. The pumping stroke is controlled by adjusting the closing timing of an electromagnetic valve, not shown, for example.

The fuel pressurized by the pump 2 is stored in the high-pressure accumulator (high-pressure common rail, or the first accumulator) 3. The high-pressure accumulator 3 is common to all of cylinders, and communicates with a fuel passage 10a. In the fuel passage 10a, a switching valve 5 comprised of a two-way type electromagnetic valve, for example, for switching the fuel injection rate is provided for each cylinder. Further, a check valve 32 is provided just downstream the switching valve 5 in the fuel passage 10a.

The fuel passage 10a branches off as a fuel passage 10b at a position downstream side the check valve 32, and the fuel passage 10b is connected to a low-pressure accumulator (low-pressure common rail, or the second accumulator) 4 which is common to all of the cylinders. A check valve 6 is provided in the fuel passage 10b, and a bypass fuel passage is additionally provided to bypass the check valve 6. An orifice 6a is provided in the bypass fuel passage. With this arrangement, if the pressure of fuel in the fuel passage 10a is higher than in the fuel passage 10b, the fuel in the fuel passage 10a gradually flows into the fuel passage 10b via the orifice 6a to flow into the low-pressure accumulator 4.

A pressure control valve 34 is provided between the low-pressure accumulator 4 and the fuel tank 17. An injector (fuel injection nozzle) 9 provided for each cylinder of the engine 1 has a control chamber 11 and fuel chamber 12 connected to the fuel passage 10a. The control chamber 11 is connected to the fuel tank 17 through a fuel return passage 10c. Reference numerals 15, 16 denote an orifice, and reference numeral 7 denotes an opening and closing valve that is comprised of, e.g. a two-way type electromagnetic valve and is disposed in a fuel return passage 10c to control the fuel injection timing. It should be noted that the opening and closing valve 7 may be incorporated in the injector 9.

The injector 9 also has a needle valve 13 for opening and closing a nozzle aperture thereof, and a hydraulic piston 14 movably disposed in the control chamber 11. The needle valve 13 is forced toward the nozzle aperture by a spring that is not illustrated.

Therefore, the fuel is supplied to the control chamber 11 and fuel chamber 12 of the injector 9 through the fuel passage 10a. If the opening and closing valve 7 for controlling the injection timing is closed, a resultant force from the spring force of the spring and the fuel pressure is applied to the needle valve 13 via the hydraulic piston 14, so that the needle valve 13 closes the nozzle aperture against the pressure of fuel in the fuel chamber 12. On the other hand, if the opening and closing valve 7 is opened to discharge the fuel in the control chamber 11 toward the fuel tank 17, the pressure of the fuel in the fuel chamber 12 causes the needle valve 13 to move toward the hydraulic piston 14 against the force of the spring to open the nozzle aperture, so that the fuel in the fuel chamber 12 is injected into a combustion chamber of the engine 1.

A variety of sensors such as a pressure sensor 3a for detecting a real pressure PHP in the high-pressure accumulator 3, pressure sensor 4a for detecting a real pressure PLP in the low-pressure accumulator 4, engine speed sensor 8a for detecting an engine speed Ne, and accelerator angle sensor 8b for detecting an accelerator pedaling amount (accelerator angle) Acc are connected to an input side of an electronic control unit (ECU) 8, and a variety of devices such as the pump 2, switching valve 5, opening and closing valve 7, and pressure control valve 34 are connected to the output side thereof.

With this arrangement, the pumping stroke of the pump 2 is variably controlled according to the engine speed Ne detected by the engine speed sensor 8a and the accelerator pedaling amount Acc detected by the accelerator angel sensor 8b, and further, the pumping stroke (fuel pressure) is feedback-controlled according to the real pressure PHP in the high-pressure accumulator 3, which is detected by the pressure sensor 3a. This acquires high-pressure fuel suitable for an engine operating state.

Further, the pressure control valve 34 is controlled according to, for example, the real pressure PLP in the low-pressure accumulator 4, which is detected by the pressure sensor 4a, and this acquires low-pressure fuel of a predetermined low pressure PL1 suitable for an engine operating state.

After the high-pressure fuel and the low-pressure fuel suitable for the engine operating state are acquired in the above-mentioned manner, a main injection period, i.e. a fuel injection period (fuel injection start/finish timing) in which the fuel is injected at a high pressure and an initial injection period in which the fuel is injected at a low pressure are determined according to the engine operating state (e.g. engine speed Ne and accelerator pedaling amount Acc) to provide control of main combustion by the main injection (main injection control device 81).

Figure 3:
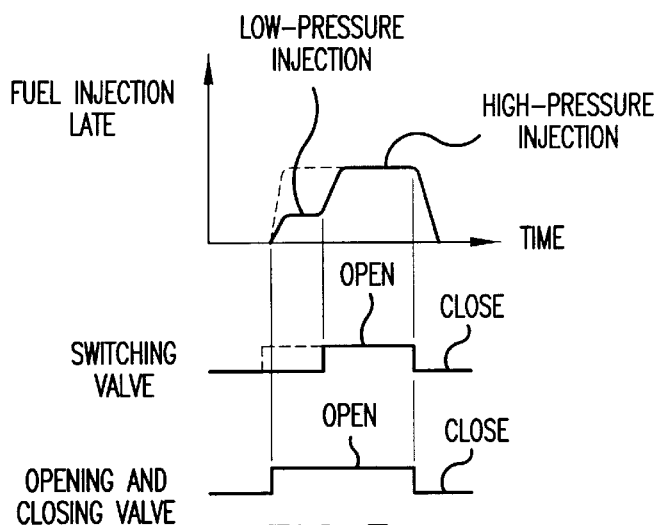
FIG. 3 is a diagram showing an injection pattern in main injection.

FIG. 3 shows an example of injection patterns in the main injection by way of a change in fuel injection rate as time passes as indicated by a solid line. A brief description of the injection pattern in the main injection will now be given with reference to FIG. 3.

The switching valve 5 and the opening and closing valve 7 are kept closed until the fuel injection starting timing, and the low-pressure fuel is supplied from the low-pressure accumulator 4 to the control chamber 11 and the fuel chamber 12 through the fuel passage 10a downstream the switching valve 5. On this occasion, since the opening and closing valve 7 is closed, the fuel pressure supplied to the control chamber 11 is applied to the needle valve 13 via the hydraulic piston 14, so that the needle valve 13 closes the nozzle aperture of the injector 9.

At the fuel injection starting timing, only the opening and closing valve 7 is opened to cause the low-pressure fuel in the control chamber 11 to be drained through the orifice 16 and the fuel return passage 10c, and the resultant force from the fuel pressure and the force of the spring, which is applied to the needle valve 13 via the hydraulic piston 14, operates to push up the needle valve 13. At a point in time when the fuel pressure in the control chamber 11 becomes smaller than that in the fuel chamber 12, the needle valve 13 moves up to open the nozzle aperture, so that the low-pressure fuel is injected from the injector 9. Namely, the initial injection is carried out at a relatively low fuel injection rate (fuel injection quantity per unit time).

The above-described initial injection at a low pressure reduces the quantity of fuel before ignition to decrease the pre-mixed combustion quantity. Therefore, the fuel is combusted relatively slowly at the initial stage of the fuel injection period, and this results in a reduction in the amount of $NO_x$ in exhaust gases.

If a predetermined period of time has elapsed from the start of the low-pressure injection, the switching valve 5 is opened to supply the high-pressure fuel to the fuel chamber 12 with the opening and closing valve 7 being kept opened, so that the high-pressure fuel is injected from the injector 9 (high-pressure main injection).

At the fuel injection finish timing, the opening and closing timing 7 for controlling the injection timing is closed to cause the high-pressure fuel supplied to the control chamber 11 to be applied to the needle valve 13 via the hydraulic piston 14, so that the needle valve 13 closes the nozzle aperture of the injector 9. The switching valve 5 is closed at the same time as the closing of the opening and closing valve 7 or upon elapse of a predetermined period of time from the fuel injection finish timing. On this occasion, a pressure regulating device 83 regulates the fuel pressure in the low-pressure accumulator 4 by controlling the pressure control valve 34 such that the inner pressure in the low-pressure accumulator 4 is maintained at a set pressure, i.e. a predetermined low pressure PL1 while returning into the fuel tank 17 the fuel flowing gradually into the low-pressure accumulator 4 from the fuel passage 10a via the orifice 6a.

A description will now be given of another injection pattern in the main injection as indicated by broken lines in FIG. 3. At the fuel injection starting timing, only the switching valve 5 is opened to supply the high-pressure fuel from the high-pressure accumulator 3 to the control chamber 11 and the fuel chamber 12 through the fuel passage 10a downstream the switching valve 5. On this occasion, since the opening and closing valve 7 is closed, the fuel pressure supplied to the control chamber 11 is applied to the needle valve 13 via the hydraulic piston 14, so that the needle valve 13 closes the nozzle aperture of the injector 9. The opening and closing valve 7 is opened subsequently to the closing of the switching valve 5, so that the high-pressure fuel in the control chamber 11 is drained via the orifice 16 and the fuel return passage 10c and the resultant force from the fuel pressure and the force of the spring, which is applied to the needle valve 13 via the hydraulic piston 14, operates to press up the needle valve 13. At a point in time when the fuel pressure in the control chamber becomes smaller than the fuel pressure in the fuel chamber 12, the needle valve 13 moves up to open the nozzle aperture so that the high-pressure fuel can be injected from the injector 9. Namely, the fuel is injected at a relatively high fuel injection rate (fuel injection quantity per unit time).

Although in the above-described example, the pressure regulating device 83 controls the pressure control valve 34 so as to regulate the fuel pressure in the low-pressure accumulator 4, this is not limitative, but the pressure control valve 34 may be comprised of a pressure regulator that is not controlled by the pressure regulating device 83. This pressure regulator has a function of controlling the fuel pressure in the low-pressure accumulator 4 to a predetermined pressure (constant pressure).

Further, the accumulator fuel injector system according to the present invention performs post injection after the above-mentioned main injection in order to activate the oxidization catalyst by raising the exhaust temperature (post injection control device 82) in the case where the temperature of an exhaust system is low, that is, in the case where the continues regenerative diesel particulate filter comprised of the diesel particulate filter 1d and the oxidization catalyst 1c cannot realize the continuous regenerating function. A description will now be given of the procedure for controlling the post injection according to the present invention.

Referring to a flow chart of FIG. 4, a description will be given of a control routine for controlling the post injection according to the present invention.

In a step S10, whether it is necessary to raise the exhaust temperature or not is determined by checking whether the amount of deposited particulate matters is in excess of a predetermined value or not.

The reason why whether it is necessary to raise the exhaust temperature or not is determined by checking whether the amount of deposited particulate matters is in excess of a predetermined value or not is that the temperature of the exhaust system can easily be detected as being low by monitoring the amount of deposited particulate matters, since the amount of deposited particulate matters is increased in the case where the temperature of the exhaust system is low and the continuous regenerative diesel particulate filter comprised of the diesel particulate filter 1d and the oxidization catalyst 1c cannot achieve the continuous regenerating function. If the exhaust temperature is raised, the predetermined value is not so large in view of the durability of the diesel particulate filter against heat since a larger amount of deposited particulate matters causes rapider heating by combustion. It should be noted that whether or not it is necessary to raise the exhaust temperature may be determined according to temperature information supplied from a catalyst temperature sensor, for example.

Figure 5:
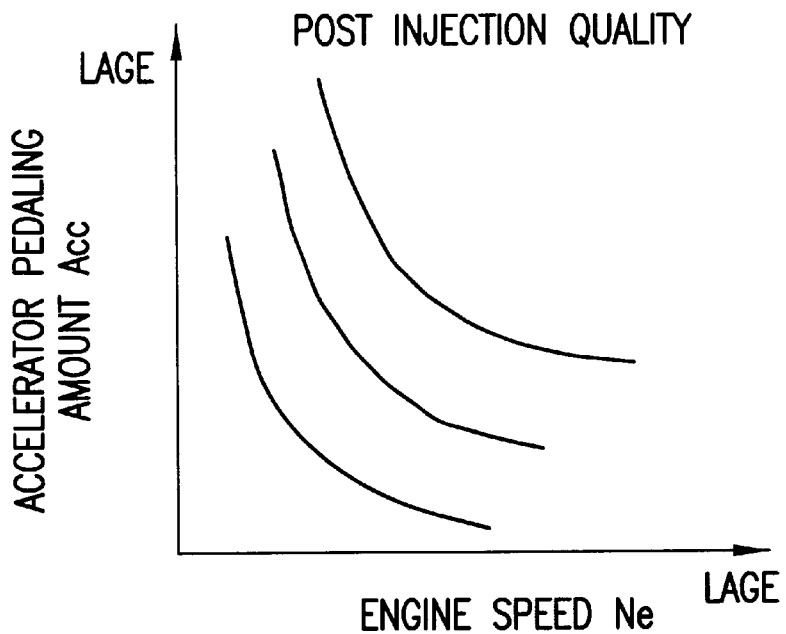
FIG. 5 is a map for use in determining the post injection quantity.

In a next step S12, the post injection quantity is determined according to the engine speed Ne and the accelerator pedaling amount Acc. Actually, the post injection quantity is determined according to a map in FIG. 5 which is set in advance based on the engine speed Ne and the accelerator pedaling amount Acc.

In a step S14, the pressure reduction finish timing t1 is calculated. More specifically, upon closing of the switching valve 5 in the fuel injection finish timing of the main injection, the high fuel pressure in the fuel passage 10a is not reduced rapidly, but is gradually drawn to the low pressure accumulator 4 via the orifice 6. Therefore, the pressure reduction period required for the fuel pressure to reach the predetermined low pressure PL1 via the orifice 6a is found, and the pressure rejection finish timing t1 is then found from the pressure reduction period and the fuel injection finish timing of the main injection (pressure reduction timing calculating device 82a).

Figure 6:
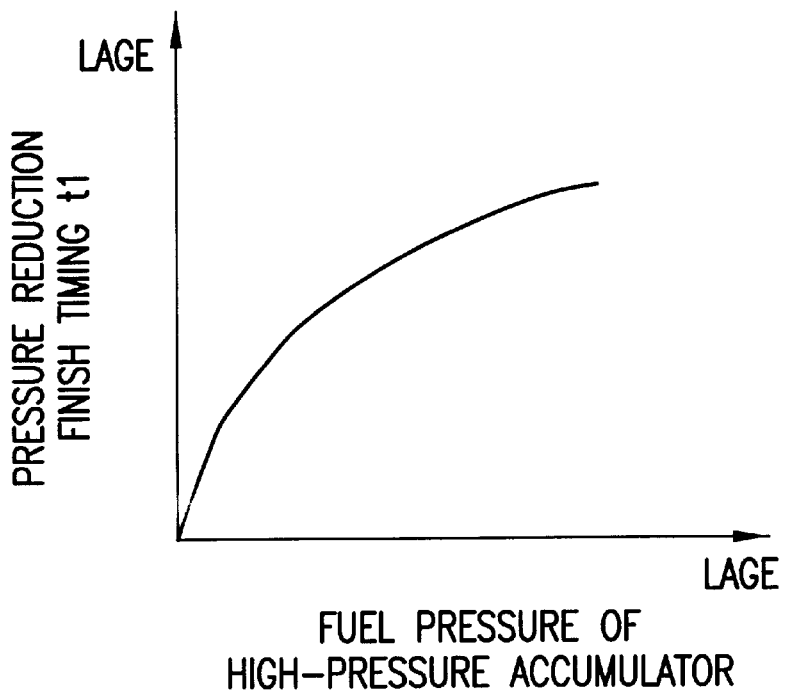
FIG. 6 is a map for use in determining the reduction finish timing t1.

In the case where the pressure regulating device 83 controls the pressure control valve 34 to maintain the fuel pressure in the low pressure accumulator 4 at a constant pressure or in the case where the pressure control valve 34 is comprised of the pressure regulator that is not controlled by the pressure regulating device 83, the high fuel pressure and the pressure reduction period has a predetermined relationship due to a constant aperture of the orifice 6. Accordingly, the high pressure (high rail pressure) and the pressure reduction finish timing t1 also have a predetermined relationship. Therefore, the pressure reduction timing t1 is univocally found from a map in FIG. 6.

In a step S16, it is determined whether or not the pressure reduction has been completed, i.e. whether or not the pressure reduction period has elapsed to reach the pressure reduction finish timing t1 where the fuel pressure reaches the predetermined low pressure PL1. If the determination result is negative (NO), i.e. if it is determined that the pressure reduction has not yet been completed, the completion of the pressure reduction is waited for.

On the other hand, if the determination result is positive (YES) in the step S16, i.e. if it is determined that the pressure reduction has been completed, namely, the pressure reduction period has elapsed to reach the pressure reduction finish timing t1 where the fuel pressure becomes equal to the predetermined low pressure PL1, the program proceeds to a step S18 to carry out the post injection.

Figure 7:
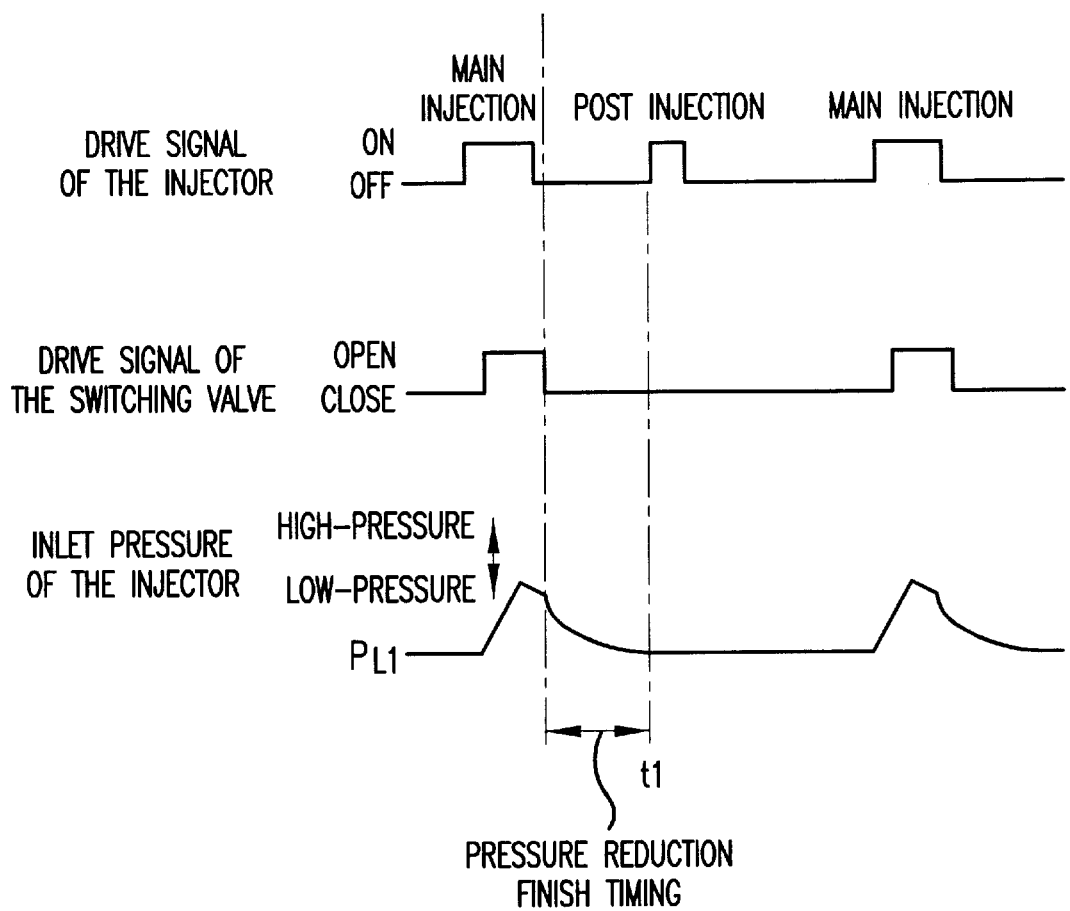
FIG. 7 is a time chart showing changes in drive signal of an injector, drive signal of a switching valve, and inlet pressure of the injector as time passes in the case where the post injection is controlled as shown in FIG. 4.

A description will now be given of the operation and effects of the present invention with reference to a time chart of FIG. 7 showing changes in drive signal of the injector 9, drive signal of the switching vale 5, and inlet pressure of the injector 9 as time passes in the case where the post injection is controlled in the above-mentioned manner.

When the drive signal of the injector 9 is turned on to start the main injection, the initial injection is carried out as stated previously and the switching valve 5 is then opened to raise the inlet pressure of the injector 9 to a high pressure to carry out the high-pressure main injection. If the high-pressure main injection is completed by closing the opening and closing valve 7 and the switching valve 5 is opened at the same time as the opening of the opening and closing valve 7 or upon elapse of a predetermined period of time from the fuel injection finish timing, the inlet pressure of the injector 9 is gradually reduced to the low pressure PL1 via the orifice 6a.

If the pressure reduction period has elapsed to reach the pressure reduction timing t1, the inlet pressure of the injector 9 becomes equal to the predetermined low pressure PL1. The post injection is then carried out.

It should be noted that the post injection may be carried out anytime until the exhaust stroke is completed after the inlet pressure of the injector 9 becomes equal to the predetermined low pressure PL1, since the inlet pressure of the injector 9 is maintained at the predetermined low pressure PL1 after the pressure reduction timing is reached upon elapse of the pressure reduction period. Actually, however, it is difficult to ignite the fuel once the flame in the combustion chamber blows out, and it is preferred that the post injection is carried out while the flame is remained in the combustion chamber. It is further preferred that the post injection is carried out immediately upon elapse of the pressure reduction period as shown in FIG. 7.

After the exhaust temperature is raised by the post injection carried out while the flame is remained in the combustion chamber and the temperature of the oxidization catalyst 1c is raised to such an extent as to oxidize the post injected fuel, the post injection may be carried out after the flame flows out in the combustion chamber.

This keeps the injection pressure, i.e. the penetration power of the injected fuel as low as possible during the post injection, and satisfactorily prevents the fuel from adhering to the wall surfaces of cylinder liners.

More specifically, the accumulator fuel injection system according to the present invention is capable of keeping the injection pressure as low as possible during the post injection by using the fuel of the low pressure PL1 for the post injection in the case where the fuel pressure in the fuel passage 10a or in the low pressure accumulator 4 is reduced to a low pressure approximate to the predetermined low pressure PL1 in the common rail system comprised of the high pressure accumulator 3 and the low pressure accumulator 4.

It is therefore possible to raise the exhaust temperature and quickly activate the oxidization catalyst 1c while satisfactorily preventing oil dilution, seizure, and the like.

It should be understood, however, that there is no intention to limit the invention to the above-described embodiment, but on the contrary, the invention is to cover all modifications, alternate constructions and equivalents falling within the spirit and scope of the invention as expressed in the appended claims.

For example, although in the above-described embodiment, the present invention aims at raising the temperature of the oxidization catalyst 1c and activating it, the present invention may suitably be applied to an $NO_x$ catalyst provided in the exhaust passage 1b.

Further, although in the above-described embodiment, the present invention aims at raising the catalyst and activating it, the present invention may be applied to post injection that is intended to burn and remove particulate matters deposited on the diesel particulate filter.

Further, although in the above-described embodiment, the pressure control valve 34 is provided in the low pressure accumulator 4 so as to control the fuel pressure in the low pressure accumulator 4 to the predetermined low pressure PL1, this is not imitative, but the pressure control valve 34 may be provided downstream the switching valve 5 in the fuel passage 10a communicating with each injector 9.

Figure 4:
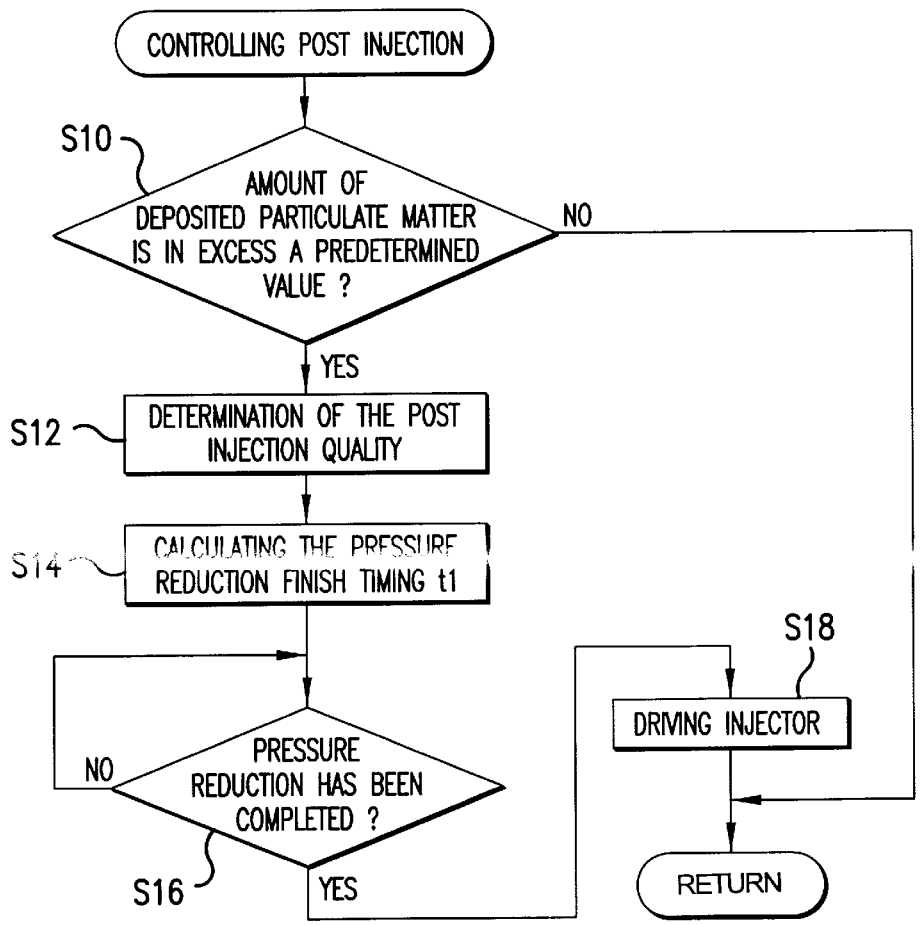
FIG. 4 is a flow chart showing a control routine for controlling post injection according to the present invention.

Further, although in the above-described embodiment, the post injection is carried out in the case where it is necessary to raise the exhaust temperature and the amount of deposited particulate matters is larger than a predetermined amount in the step S10 in the flow chart of FIG. 4, this is not limitative, but whether or not it is necessary to raise the exhaust temperature may only be determined without checking the amount of deposited particulate matters in the step S10 to carry out the post injection.

We claim:

1. An accumulator fuel injection system, comprising:

a first accumulator for storing high-pressure fuel;

a fuel injection nozzle connected to said first accumulator via a fuel passage to inject fuel into a combustion chamber of an engine;

a switching valve for connecting and disconnecting the high-pressure fuel stored in said first accumulator to and from said fuel passage;

a second accumulator connected to a part downstream said switching valve in said fuel passage via a branch passage, said second accumulator storing fuel of lower pressure than the high-pressure fuel in said first accumulator;

a pressure control valve provided in at least one of the part downstream of said switching valve in said fuel passage and said second accumulator, said pressure control valve regulating a fuel pressure in said second accumulator and said fuel passage;

an opening and closing valve for controlling injection of fuel from a fuel injection nozzle;

a main injection control device for controlling said switching valve and said opening and closing valve according to an operating state of the engine such that main fuel is injected from said fuel injection nozzle for a predetermined period of time; and a post injection control device for injecting additional fuel from said fuel injection nozzle after said main injection control device injects the main fuel, in a case where it is necessary to raise an exhaust temperature of the engine, wherein said post injection control device provides control such that additional fuel is injected from said fuel injection nozzle when the fuel pressure in said fuel passage or said second accumulator has been reduced to a low pressure approximate to a pressure of the low-pressure fuel stored in said second accumulator via said pressure control valve.

2. An accumulator fuel injection system according to claim 1, wherein:

said pressure control valve regulates the fuel pressure in the second accumulator or said fuel passage to a preset low pressure after said switching valve is switched for disconnection at a point in time when the injection of the main fuel by said main fuel injection control device is finished, or after the injection of the main fuel by said main fuel injection control device is finished.

3. An accumulator fuel injection system according to claim 1, further comprising:

a pressure regulating device for controlling said pressure control valve to regulate the fuel pressure in said second accumulator or said fuel passage to a preset low pressure, wherein said post injection control device injects additional fuel after said pressure regulating device lowers the fuel pressure in said second accumulator or said fuel passage is reduced to a preset low pressure after said switching valve is switched for disconnection at a point in time when the injection of the main fuel by said main injection control device is finished, or after the injection of the main fuel by said main injection control device is finished.

4. An accumulator fuel injection system according to claim 1, wherein:

said post injection control device includes a pressure reduction time calculating device for calculating a pressure reduction period until the fuel pressure in said second accumulator or said fuel passage is reduced to the preset low pressure or to a predetermined low pressure after said switching valve is switched for disconnection at a point in time when the injection of the main fuel by said main injection control device is finished, or after the injection of the main fuel by said main injection control device is finished, and calculating a pressure reduction finish timing according to the pressure reduction period and the timing in which said switching valve is switched for disconnection, wherein said post injection control device injects additional fuel according to the pressure reduction timing calculated by said pressure reduction timing calculating device.

* * * * *